United States Patent [19]

Strassburg

[11] 4,329,548
[45] May 11, 1982

[54] TELEPHONE STERILIZER APPARATUS

[76] Inventor: Jack W. Strassburg, 605 Park Ave., New York, N.Y. 10021

[21] Appl. No.: 156,381

[22] Filed: Jun. 4, 1980

[51] Int. Cl.³ .......................... H04M 1/17; H04R 1/12
[52] U.S. Cl. ...................................................... 179/185
[58] Field of Search ......................................... 179/185

[56] References Cited

U.S. PATENT DOCUMENTS 1,259,481  3/1918  Brown .................................. 179/185
1,474,186  11/1923  Abbott ................................ 179/185

FOREIGN PATENT DOCUMENTS 2522814  12/1976  Fed. Rep. of Germany ...... 179/185
748564   6/1933   France ................................ 179/185
2303430  10/1976  France ................................ 179/185

*Primary Examiner*—George G. Stellar
*Attorney, Agent, or Firm*—Hubbell, Cohen, Stiefel & Gross

[57] ABSTRACT

A telephone sterilizer apparatus (10) employing a liquid disinfectant (50) saturated absorbent pad (42) which is substantially replenished so as to maintain saturation due to capillarity such as by a wick (44) extending from the pad (42) in capillary communication with a container (36) for the liquid disinfectant (50). The apparatus (10) is mounted on a telephone handset cradle (14) via a complementary mounting portion (12) and includes a receptacle (30) for the handset (16) mouthpiece (31) to be sterilized by the pad (42) which is seated in the receptacle (30) below the upper extent of a surrounding perimetral wall (32).

7 Claims, 7 Drawing Figures

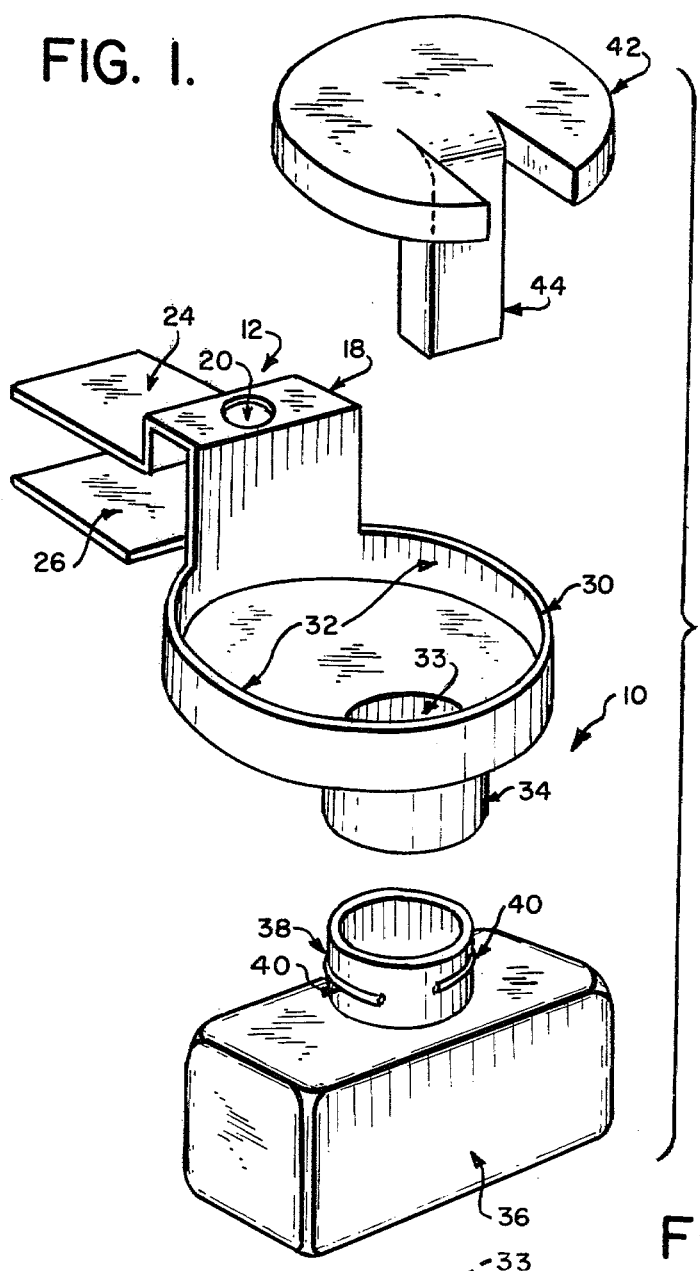
FIG. I.
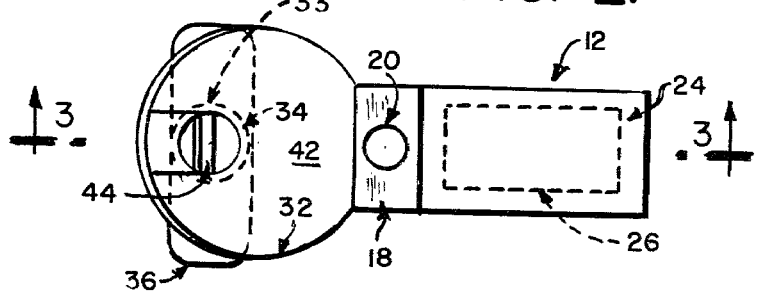
FIG. 2.

TELEPHONE STERILIZER APPARATUS

TECHNICAL FIELD

The present invention relates to telephone sterilizers.

BACKGROUND ART

Telephone sterilizers, that is devices for sterilizing a telephone handset so that the mouthpiece is sterilized between the uses, are well known in the art. Examples of such prior art telephone sterilizers are disclosed in U.S. Pat. Nos. 3,530,261; 3,018,337; 2,286,900; and 2,188,958. These prior art telephone sterilizers, known to applicant, have basically been of two types; one in which a pressurized or gaseous disinfectant is activated by placement of the handset onto the cradle, such as disclosed in U.S. Pat. Nos. 3,018,337 and 2,286,900; or the type in which a disinfectant impregnated, non-replenished pad having limited use is employed, such as disclosed in U.S. Pat. Nos. 3,530,261 and 2,188,958. Such prior art limited use pads have not proved satisfactory since they require constant replacement and have a tendency to readily dry up. On the other hand, the prior art systems employing a gaseous disinfectant have not proven satisfactory due to potential mechanical problems with the activation mechanism as well as due to the present concern relating to the use of fluorocarbon and other propellants. These disadvantages of the prior art are overcome by the present invention.

DISCLOSURE OF THE INVENTION

The present invention relates to a telephone sterilizer apparatus adapted for use in conjunction with a telephone having a handset and a cradle for removably retaining the handset when the telephone is not in use wherein the sterilizer apparatus is supportably mounted on the cradle and includes an absorbent pad which is saturated by a disinfectant liquid due to capillarity, such as by a wick associated with a liquid disinfectant container, such as a removably mountable container. The mounting arrangement for supportably mounting the apparatus on the cradle may preferably have a configuration complementary to the configuration of the cradle for facilitating support thereon. The apparatus includes a receptacle for seating the mouthpiece portion of the handset when the apparatus is mounted on the cradle with the receptacle having an upstanding surrounding perimetral wall portion for receivably surrounding the seated mouthpiece portion. The absorbent pad is seated in the receptacle below the upper extent of the perimetral wall portion. A connector portion, such as a threaded or snapped-fittable connector, is in flow-through communication with the receptacle and a passageway is provided between the connector portion and the receptacle. The removably mountable liquid disinfectant container has a neck portion which is mountable on the connector portion in flow-through communication with the passageway for enabling the pad to be saturated by the containerized liquid disinfectant, with the pad being seated in the receptacle with a portion thereof in capillary communication with the passageway for drawing liquid disinfectant from the mounted container to the pad through the passageway due to capillarity for substantially replenishing the liquid disinfectant in the pad for maintaining the saturation of the pad. If desired, the container can be integrally formed with the receptacle from an inexpensive plastic in which instance the entire apparatus is disposable.

BRIEF DESCRIPTION OF DRAWINGS

FIG. 1 is an exploded perspective view of the presently preferred embodiment of a telephone sterilizer apparatus in accordance with the present invention;

FIG. 2 is a plan view of the sterilizer apparatus of FIG. 1;

BEST MODE FOR CARRYING OUT THE INVENTION

Figure 3:
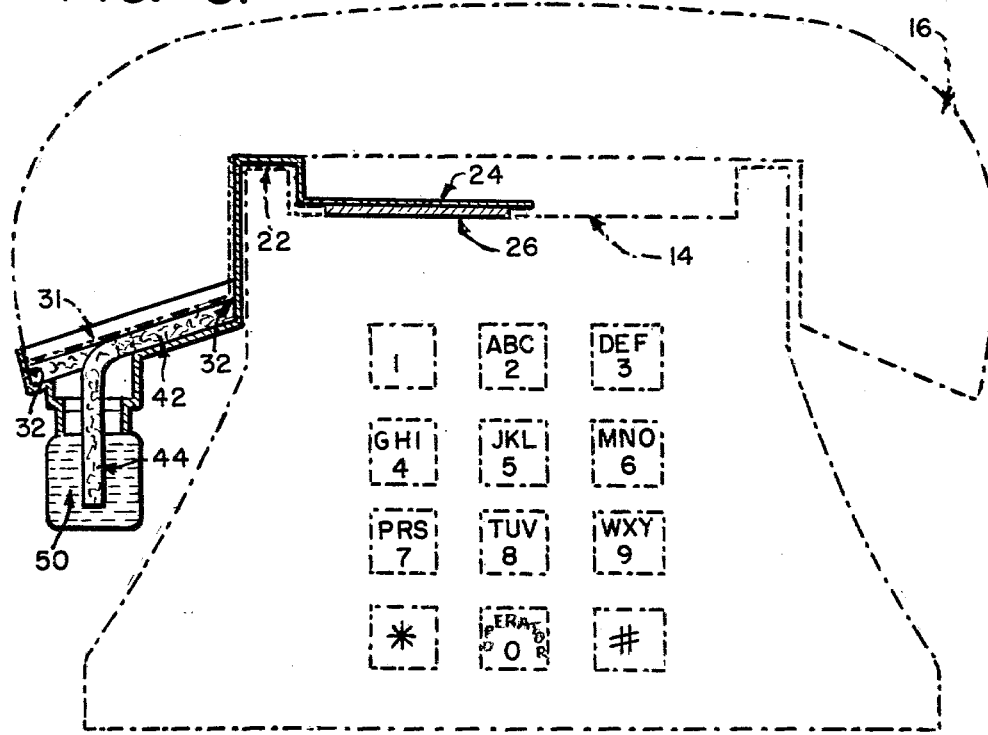
FIG. 3 is a sectional view taken along line 3—3 in FIG. 2 of the sterilizer apparatus of FIG. 1 in place on a telephone with which the apparatus of FIG. 1 may be utilized, with the telephone being illustrated therein by dotted lines.

Referring now to the drawings in detail, and initially to FIGS. 1 to 3 thereof, the presently preferred embodiment of the telephone sterilizer apparatus of the present invention, generally referred to by the reference numeral 10, is shown. As shown and preferred in FIG. 1, the sterilizer apparatus 10 preferably includes a mounting portion 12 which, as illustrated in FIG. 3, is preferably configured so as to be complementary to the configuration of a conventional cradle 14 for a conventional telephone handset 16 with which the apparatus 10 is to be employed. In preferably being so configured, the mounting portion 12 preferably contains a U-shaped piece 18 having a central aperture 20 therein which fits over one of the hooks 22 of the telephone cradle 14. The aperture 20 is preferably designed so as to fit over the disconnect button associated with hook 22 and is of sufficient diameter so as not to interfere with the normal operation of the disconnect button. The mounting portion 12 also includes an outwardly extending portion 24 having an associated adhesive backed pad 26 for facilitating attachment of portion 24 to the telephone cradle 14.

The telephone sterilizer apparatus 10 also includes a receptacle 30 for seating the mouthpiece portion 31 of the conventional telephone handset 16 therein when the apparatus 10 is mounted on the cradle 14, such as illustrated in FIG. 3. As shown and preferred in FIGS. 1 and 3, the receptacle 30 preferably has an upstanding surrounding perimetral wall portion 32 for receivably surrounding the seated mouthpiece 31. The receptacle 30 also includes a connector portion 34 extending downwardly therefrom, which connector 34 may contain internal threads or other attachment means therein as well as providing a passageway for liquid therethrough into the bottom of the receptacle 30 from the connector portion 34. A liquid disinfectant container 36, such as one preferably having a neck portion 38, such as one having complementary threads 40 which are complementary to the internal threads of the connector portion 34, is threadably or snap-fittably mountable on the connector portion 34 in flow-through communication with the passageway. The container 36 preferably contains a conventional liquid disinfectant to be used in sterilizing the telephone handset mouthpiece 31. As shown and preferred in FIG. 1, an absorbent pad 42, such as one made of felt or some other conventional absorbent material useable with liquid disinfectant and saturateable thereby, is preferably seated in the receptacle 30 so as to completely fit therein, such as illustrated in FIG. 3, and preferably includes a downwardly extending integrally formed wick portion 44 which extends through the passageway 33 and into the interior of the liquid disinfectant container 36 so as to draw liquid disinfectant from the mounted container 36 to the pad 42 through the passageway 33 due to capillarity. In such a preferred arrangement, the capillary communication of the pad 42 with the liquid disinfectant substantially replenishes the liquid disinfectant in the pad 42 so as to maintain the saturation of the pad 42. Such capillary communication is illustrated in FIG. 3 in which the liquid disinfectant is represented by reference numeral 50 with the pad 42 being illustrated as "wicking up" the liquid disinfectant 50 via wick portion 44. By such an arrangement, the pad 42 does not dry up and remains saturated as long as liquid disinfectant 50 is present in the container 36, with the size of the container 36 determining the length of use before replacement. When such replacement is required it is merely a matter of detaching the container 36, such as by unscrewing or unsnapping it, and replacing it with a fresh container. Thus, the present invention provides long term use without the disadvantages of gaseous propellant or moving parts.

Figure 4:
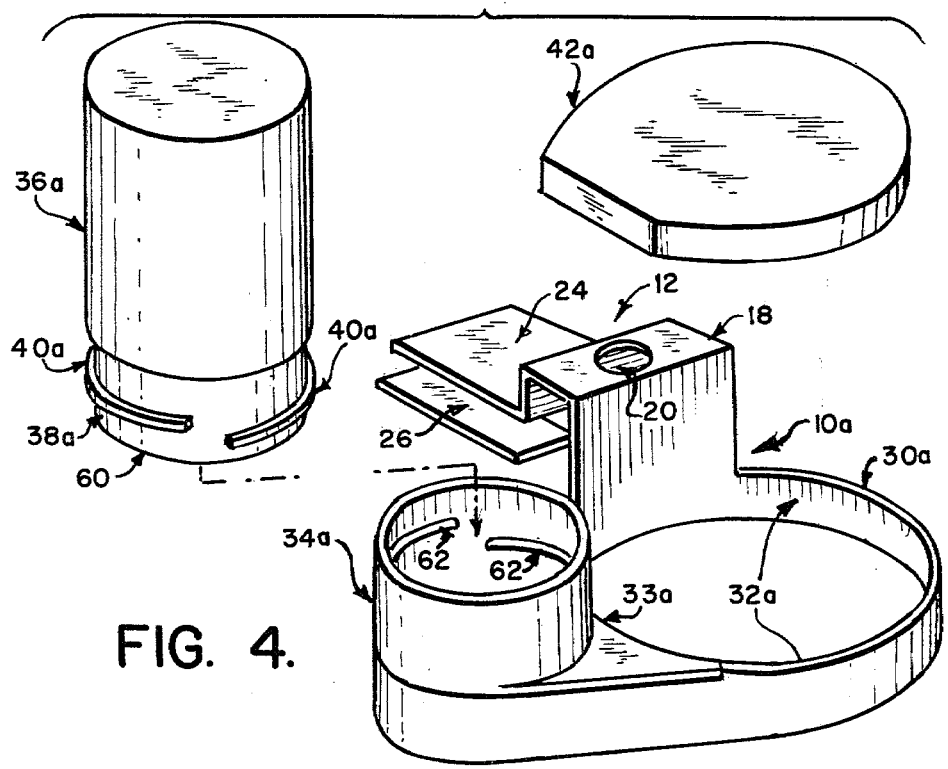
FIG. 4 is an exploded perspective view similar to FIG. 1 of an alternative embodiment of the sterilizer apparatus of the present invention.
Figure 5:
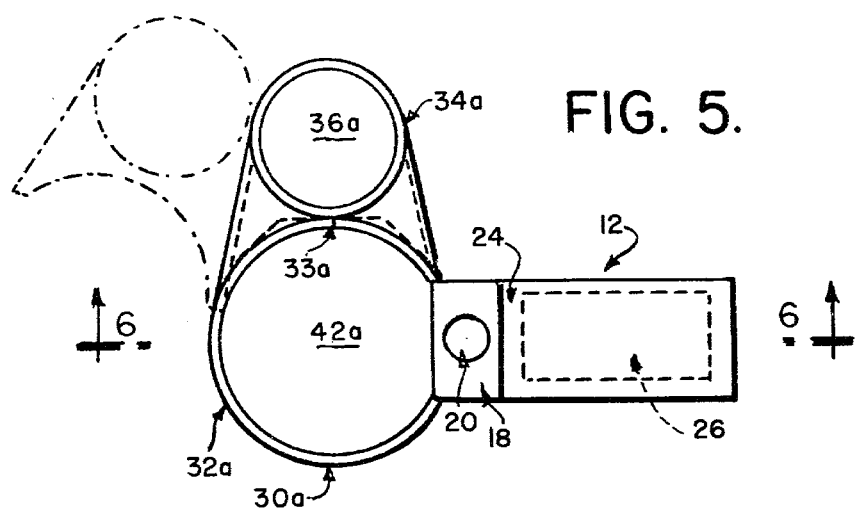
FIG. 5 is a plan view similar to FIG. 2 of the alternative embodiment of FIG. 4.
Figure 6:
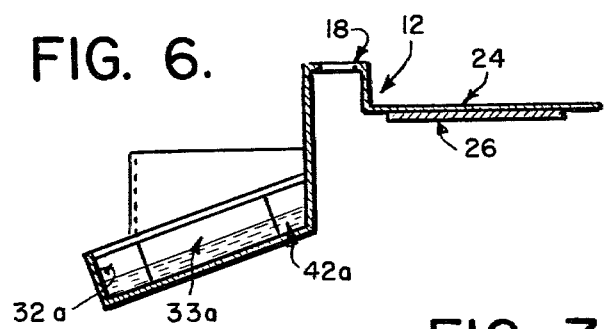
FIG. 6 is a sectional view similar to FIG. 3 taken along line 6—6 of FIG. 5 illustrating the embodiment of FIG. 4.

Referring now to FIGS. 4–6, an alternative embodiment of the sterilizer apparatus 10 of the present invention is shown. This alternative embodiment shall generally be referred to by reference numeral 10a. The alternative embodiment 10a of FIGS. 4–6 includes a mounting arrangement preferably identical with mounting arrangement 12 of the embodiment of FIG. 1 and, accordingly, identical reference numerals have been employed in FIGS. 4–6 for identically functioning components. Thus, as will be explained in greater detail hereinafter, the primary difference between the embodiment of FIGS. 1–3 and and FIGS. 4–6 is that the capillarity through which saturation of the absorbent pad is achieved in the embodiment of FIGS. 1–3 is due to a wicking up action whereas the embodiment of FIGS. 4–6 is based on a self-leveling liquid container in which the pressure in the mounted container 36a is preferably equalized by the liquid disinfectant level in the receptacle 30a and, hence, the liquid disinfectant level in the pad 42a so as to maintain the saturation of the pad 42a.

The receptacle 30a is similar to the receptacle previously described with reference to FIG. 1, with the primary differences residing in the location of the passageway 33a in the side perimetral wall 32a as opposed to the location of the passageway 33 in the bottom of the receptacle 30, and the location of the connector 34a. Thus, connector 34a, rather than extending below the receptacle 30 as in FIG. 1, is located adjacent to the receptacle 30a and upwardly extends therefrom so as to enable the container 36a to be mounted in the inverted position with respect to the receptacle 30a. The connector 34a, and hence the container 36a mounted therein, is in flow-through communication with the interior of the receptacle 30a, and thus with the pad 42a seated therein. As shown and preferred in FIG. 4, absorbent pad 42a is configured so as to seat within the interior of receptacle 30a against the exit end of passageway 33a which pad 42a has a thickness or height sufficient so that the level of liquid disinfectant in the pad 42a, which will maintain the pad 42a saturated, is at the level of the mouth 60 of the mounted container 36a so that the pressure in the mounted container 36a is equalized by the liquid disinfectant level in the pad 42a, which is consistent with the concept of a self-leveling liquid container. In this regard it should be noted that normally the pressure inside the container 36a is less than atmospheric pressure. As shown and preferred in FIG. 4, container 36a includes a neck portion 38a which may contain threads 40a thereon which are complementary to internal threads 62 of connector 34a in which the container 36a is threadably mounted so as to dispense liquid disinfectant. As is illustrated in FIG. 3, the container 36 in the preferred embodiment is mounted below the telephone handset 16. However, in the embodiment of FIGS. 4–6 the container 36a is mounted behind the telephone handset. This can be seen by reference to the plan view of FIG. 5 since the mounting portion 12 is preferably identical to that of the embodiment of FIG. 1 and is complementary to the cradle 14. Thus, it will be understood that mouthpiece portion 31 of handset 16 is seated in receptacle 30a on absorbent pad 42a with the handset 16 then normally extending from left to right in the illustration of FIG. 5. Thus, as shown in FIG. 5, container 36a would be behind the seated handset 16.

It should be noted that preferably the mounting portion 12 as well as the receptacle 30 and connector 34 are integrally formed from a suitable plastic, such as a suitable thermoplastic resin including such resins as polymeric olefins, such as polyethylene, polypropylene, ethylene-propylene copolymer; vinyl polymers such as polyvinyl chloride, polymethylmethacrylate, copolymers of a vinyl monomer with another ethylenically unsaturated monomer copolymerizable therewith, polystyrene, copolymers of styrene amd butadiene or acrylonitride, polycarbonate resins, alhyd resins, polyacrylonitride; or suitable thermosetting resins such as phenol-formaldehyde resins, melanine-formaldehyde resins.

Figure 7:
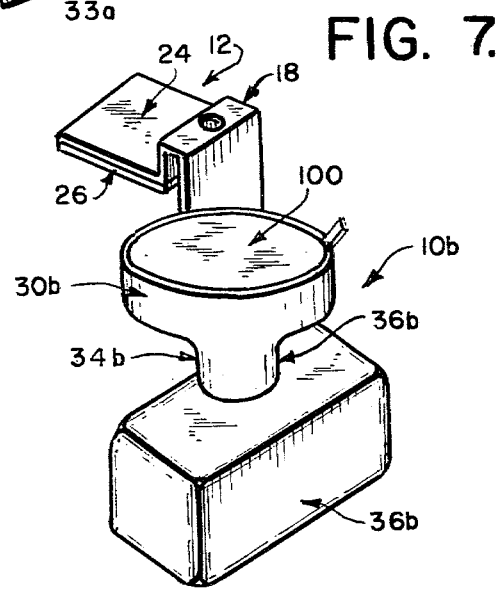
FIG. 7 is a fragmentary perspective view, similar to FIG. 1, of another alternative embodiment of the sterilizer apparatus of FIG. 1.

Referring now to FIG. 7, another alternative embodiment 10b of the sterilizer apparatus 10 of FIG. 1 is shown. This embodiment 10b is preferably identical in function and operation of the embodiment 10 of FIGS. 1–3 with the exception that the liquid disinfectant container 36b is integrally formed with the receptacle 30b and connector portion 34b so that the neck portion 38b of the container 36b is formed as a single piece with the connector portion 34b. The apparatus 10b is preferably formed of a suitably inexpensive plastic so that the entire apparatus 10b may be disposable and readily replaced. As shown and preferred in FIG. 7, prior to initial use, the receptacle 30b which contains the wick 42–44 is suitably sealed by a removable moisture impermeable seal 100 such as a foil seal. When the seal is removed, it exposes the wick 42–44 to the air and the apparatus 10b functions in the same manner as the apparatus 10 of FIG. 1.

By utilizing the telephone sterilizer apparatus of the present invention substantially constant replenishment of the absorbent pad so as to provide long term usage may be provided in a simple and efficient manner.

What is claimed is:

1. A telephone sterilizer apparatus adapted for use in conjunction with a telephone having a handset and a cradle for removably retaining said handset when said telephone is not in use, said handset having a mouthpiece portion for use in speaking into said telephone when said handset is removed from said cradle, said sterilizer apparatus comprising mounting means adapted for supportably mounting said apparatus on said cradle; a receptacle for seating said mouthpiece portion therein when said apparatus is mounted on said cradle, said receptacle having an upstanding surrounding perimetral wall portion for receivably surrounding said seated mouthpiece portion; an absorbent pad seated in said receptacle below the upper extent of said perimetral wall portion, said pad being capable of saturation by a disinfectant liquid; a connector portion in flow-through communication with said receptacle; a passageway between said connector portion and said receptacle; and a liquid disinfectant container having a neck portion extending from said connector portion in flow-through communication with said passageway for enabling said pad to be saturated by said containerized liquid disinfectant, said pad being seated in said receptacle with a portion thereon in capillary communication with said liquid disinfectant through said passageway for drawing liquid disinfectant from said mounted container to said pad through said passageway due to capillarity for substantially replenishing said liquid disinfectant in said pad for maintaining the saturation of said pad.

2. An apparatus in accordance with claim 1 wherein said pad comprises a wick portion extending therefrom through said passageway, said wick portion having a sufficient longitudinal extent so as to maintain capillary communication with said containerized liquid disinfectant.

3. An apparatus in accordance with claim 1 wherein said liquid disinfectant container neck portion is removably mountable on said connector portion in said flow through communication.

4. An apparatus in accordance with claim 3 wherein said container is mounted below said receptacle, said pad wick wicking up said containerized liquid disinfectant.

5. An apparatus in accordance with claim 3 wherein said mounting means has a configuration complementary to the configuration of said cradle for enabling said supportable mounting thereon.

6. An apparatus in accordance with claim 3 wherein said connector portion comprises a threaded connector, said container being mounted thereon in said flow-through communication with said passageway.

7. An apparatus in accordance with claim 1 wherein said receptacle and mounting means are formed from a plastic.

* * * * *